Patented Aug. 25, 1925.

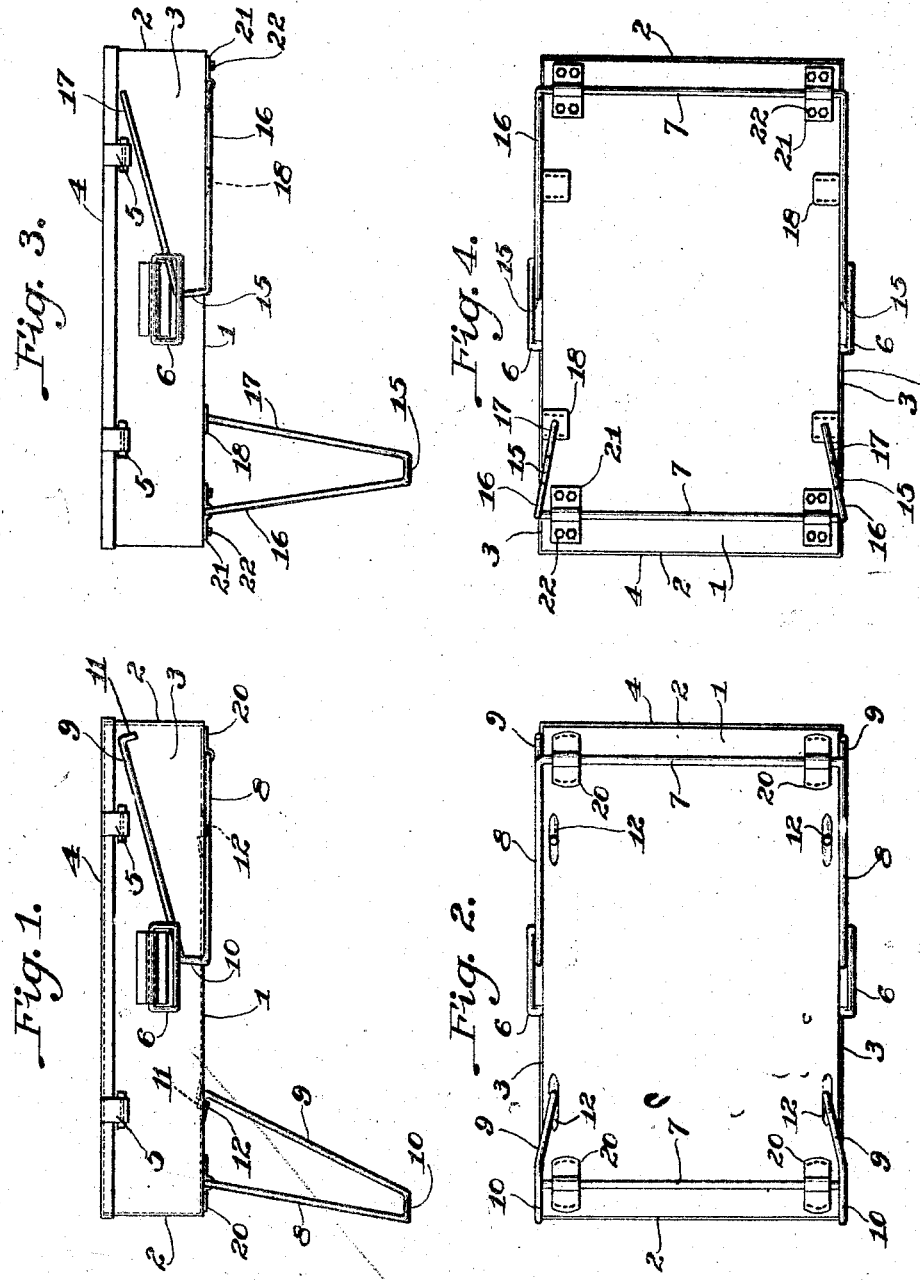

1,550,822

UNITED STATES PATENT OFFICE.

FRED G. KLINERT, OF DULUTH, MINNESOTA, ASSIGNOR TO HUGO MANUFACTURING COMPANY, OF WEST DULUTH, MINNESOTA, A CORPORATION OF MINNESOTA.

SUPPORT FOR PORTABLE STOVES.

Application filed March 7, 1925. Serial No. 13,744.

*To all whom it may concern:*

Be it known that I, FRED G. KLINERT, a citizen of the United States, and a resident of Duluth, in the county of Saint Louis and State of Minnesota, have invented a new and useful Improvement in Supports for Portable Stoves, of which the following is a specification.

The invention relates to portable or camp stoves of the type which includes a casing containing a fuel burner or burners and provided with legs which may be folded in compact form upon the casing when the stove is not in use, and may be unfolded to support the casing when the stove is in or ready for use.

The object of the invention is to provide the casing of such a stove with legs which are simple in construction, economical to manufacture, easy to manipulate, and which remain in folded position when so placed.

The invention is illustrated in the accompanying drawings of which Fig. 1 is a side view of a stove casing provided at its ends with two pairs of legs, one pair being shown in folded and the other in unfolded position; Fig. 2 a bottom plan view of the stove of Fig. 1; Fig. 3 a view corresponding to Fig. 1 showing a modification of leg construction; and Fig. 4 a bottom plan view of the stove of Fig. 3.

Referring first to the embodiment of the invention illustrated in Figs. 1 and 2, there is shown a stove casing having a bottom 1, end walls 2, side walls 3, and a cover 4 which may be pivoted to one of the side walls and be held in closed position by clips 5 pivoted to the outer edge of the lid and adapted to engage a side wall 3. As is customary, the casing is also provided with a handle 6 for carrying the stove.

According to this invention folding legs are arranged at the sides of the casing, each leg being formed of a bar of resilient metal bent in such a manner that its ends are spaced apart and that it has a supporting foot intermediate of its ends. One end of each leg is pivoted to the casing, and its other end is bent inwardly to engage the bottom of the casing when the leg is unfolded, and because of the resiliency of the bar of which the leg is made, the free or unpivoted end of the leg grips the side of the casing when the leg is folded, and thus adequately holds the leg in folded position without the provision of a special device for this purpose.

In the embodiment of the invention illustrated in Figs. 1 and 2, there are a pair of legs at each end of the casing, each pair being formed of a resilient bar which is preferably a steel rod, having an intermediate portion 7 pivoted to the bottom 1 of the casing, and having each end bent in loop form to provide two sections 8 and 9 of a leg with an intermediate foot 10 adapted to rest upon a support. The section 9, or free end of the leg, is bent inwardly so that when the leg is unfolded such end lies beneath the bottom of the casing so that it may engage such bottom to support the stove. Preferably the extreme end of section 9 of each leg is provided with a hook 11 which engages a pocket 12 formed in the casing bottom, the leg being so shaped that the resiliency of the metal from which it is formed holds hook 11 in pocket 12.

At the left ends of Figs. 1 and 2 the pair of legs are shown in their unfolded positions with hooks 11 engaging pockets 12. At the right ends of these figures the pair of legs is shown in folded position, and in such position the outer or free ends of the legs grip the side walls 3 of the casing and thereby effectively hold the legs in folded position. To change a pair of legs from its unfolded or stove-supporting position to its folded position, it is only necessary to press their free ends towards the center of the casing to remove hooks 11 from pockets 12, and to then press on spring sections 9 outwardly so that they may be swung to the sides of the casing which they grip.

In the embodiment of the invention illustrated in Figs. 3 and 4 the legs are of general V-shape each having a foot 15, which, when the leg is unfolded and the stove is resting on a horizontal support, lies vertically between the pivoted end 16 and free end 17 of the leg. In this form of leg, its free end is preferably not provided with a hook, but rests directly upon the bottom of the casing, which may be provided with a reenforcing or wear plate 18 against which the free end of the leg bears. As in the case of the legs illustrated in Figs. 1 and 2, those shown in Figs. 3 and 4 have their free ends turned inwardly so that when unfolded they engage the bottom of the casing, and that when sprung and folded they grip the side walls of the casing to hold the legs in folded position.

For pivoting the legs to the casing, plates 20 having grooves which receive intermediate section 7 may be variously attached to bottom 1. In Figs. 1 and 2 plates 20 are indicated as being spot-welded to the casing bottom, whereas similar plates 21 are shown in Fig. 4 as being removably attached to the bottom by bolts 22.

It will be observed that the supporting legs provided according to this invention are of such simple construction that they may be economically manufactured; that they are so shaped and arranged that they may be easily moved from one to the other of their alternate positions; and that when in their folded positions they effectively grip the sides of a casing to retain them in such positions.

According to the provisions of the patent statutes, I have explained the principle and operation of my invention, and have illustrated and described constructions which I now believe to represent its best embodiments. However, I desire to have it understood that, within the scope of the appended claims the invention may be practiced by other forms of construction than those particularly illustrated and described.

I claim as my invention:

1. In a portable stove, a casing having a bottom, side and end walls, and a pair of folding legs at the sides of the casing adjacent to one end thereof, said pair of legs being formed of a single resilient bar having a section intermediate of its ends pivotally attached to the casing bottom and having its ends bent in loop form at the sides of the casing, the free ends of said legs being normally turned inwardly for engaging the bottom of the casing when unfolded and free from bending stress, and for yieldingly gripping the sides of the casing when folded and bent outwardly.

2. In a portable stove, a casing having a bottom, side and end walls, said bottom being provided with a leg-receiving pocket, and a folding leg at a side of the casing comprising a resilient bar having a foot and having its ends spaced apart, one end of said leg being pivoted to said casing and its other end being provided with a hook for engaging said pocket in the casing bottom when the leg is unfolded, the resiliency of said leg causing its free end to grip the side of the casing when the leg is folded and causing its hook to engage said pocket when the leg is unfolded and in stove-supporting position.

3. In a portable stove, a casing having a bottom, side and end walls, said bottom being provided at each end with leg-receiving pockets, and a pair of folding legs at the sides of each end of the casing, each pair of legs being formed of a single resilient bar having a section intermediate of its ends pivotally attached to the casing bottom and having its ends bent in loop form at the sides of the casing, the outer ends of the legs being provided with hooks for engaging said pockets in the casing bottom when the leg is unfolded, the resiliency of said legs causing their free ends to grip the sides of the casing when the legs are folded and causing the hooks of the legs to engage said pockets when the legs are unfolded and in stove-supporting position.

In testimony whereof, I sign my name.

FRED G. KLINERT.